United States Patent
Davies

(10) Patent No.: US 10,108,440 B2
(45) Date of Patent: Oct. 23, 2018

(54) INTERACTIVE TROUBLESHOOTING FLOWCHARTS

(75) Inventor: Joseph G Davies, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1415 days.

(21) Appl. No.: 12/953,490

(22) Filed: Nov. 24, 2010

(65) Prior Publication Data

US 2012/0131557 A1    May 24, 2012

(51) Int. Cl.
| | |
|---|---|
| G06F 3/00 | (2006.01) |
| G06F 3/048 | (2013.01) |
| G06F 9/44 | (2018.01) |
| G06F 11/00 | (2006.01) |
| G06F 9/451 | (2018.01) |
| G06F 11/07 | (2006.01) |
| G06F 11/36 | (2006.01) |

(52) U.S. Cl.
CPC ............ *G06F 9/453* (2018.02); *G06F 11/079* (2013.01); *G06F 11/0793* (2013.01); *G06F 11/3664* (2013.01)

(58) Field of Classification Search
None
See application file for complete search history.

(56) References Cited

U.S. PATENT DOCUMENTS

| | | | | |
|---|---|---|---|---|
| 6,393,490 | B1 * | 5/2002 | Stiles et al. | ................ 719/313 |
| 7,669,085 | B2 | 2/2010 | Alam et al. | |
| 2002/0161875 | A1 | 10/2002 | Raymond | |
| 2003/0130752 | A1 | 7/2003 | Gasiorek et al. | |
| 2005/0210444 | A1 * | 9/2005 | Gibson et al. | ................ 717/108 |
| 2006/0106796 | A1 | 5/2006 | Venkataraman et al. | |
| 2008/0269921 | A1 | 10/2008 | Banerji et al. | |

(Continued)

OTHER PUBLICATIONS

"Interactive flowchart", Retrieved at << http://www.imapbuilder.com/customization/interactive_flowchart_php >>, Retrieved date: Sep. 13, 2010, pp. 5.

(Continued)

*Primary Examiner* — Lewis A Bullock, Jr.
*Assistant Examiner* — Mark A Gooray

(57) ABSTRACT

An interactive troubleshooting system is described herein that provides a dynamically changing user interface that readers click through to solve problems. Each click changes the display of the flowchart so that irrelevant troubleshooting options are unavailable and the reader's path through the overall flowchart is clearly shown. By showing the path, the reader can see the process and the interrelationships between system components and understand more deeply the troubleshooting process beyond the step-by-step troubleshooting tasks. The interactive troubleshooting system clearly displays a path taken through the flowchart, and reduces visual clutter. Upon following a path, sections of the flowchart that cannot be followed due to the steps taken are made unavailable. The interactive troubleshooting system provides a visual indication of areas of troubleshooting focus. The system can record the user's path through the flowchart. Once a root cause is identified, the system can query the user to capture end-of-process feedback information.

17 Claims, 4 Drawing Sheets

(56) References Cited

U.S. PATENT DOCUMENTS

| | | | |
|---|---|---|---|
| 2009/0271737 A1* | 10/2009 | Borkar | G06F 3/04845 715/821 |
| 2009/0276706 A1 | 11/2009 | Lukes | |
| 2010/0083172 A1* | 4/2010 | Breeds et al. | 715/810 |
| 2010/0153852 A1* | 6/2010 | McCallum et al. | 715/736 |
| 2010/0229022 A1 | 9/2010 | Anand et al. | |
| 2011/0041099 A1* | 2/2011 | Weise et al. | 715/854 |
| 2011/0289408 A1* | 11/2011 | Chitlur | G06F 3/0481 715/702 |
| 2011/0289459 A1* | 11/2011 | Athans et al. | 715/854 |

OTHER PUBLICATIONS

Russel, "Interactive HTML slideshow / flowchart", Retrieved at << http://ca.answers.yahoo.com/question/index?qid=20100624211656AArYAp6 >>, Sep. 13, 2010, pp. 2.

Legg, at el., "Interactive troubleshooting guide for accelerators", Retrieved at << http://epaper.kek.jp/pac97/papers/pdf/9P063.PDF >>, American Physical Society, Particle Acceleration Meeting, May 12-16, 1997, pp. 3755-3757.

"ISDN BRI Troubleshooting Flowchart", Retrieved at << http://www.cisco.com/en/US/tech/tk801/tk379/technologies_tech_note09186a0080094bb8.shtml >>, Retrieved date: Sep. 13, 2010, pp. 20.

* cited by examiner

INTERACTIVE TROUBLESHOOTING FLOWCHARTS

BACKGROUND

Flowcharts have long been used for documenting steps to troubleshoot problems. Call centers and support services for software companies often create flowcharts that detail diagnostic steps for common problems. Information Technology (IT) professionals use the flowcharts to ask users a series of questions designed to methodically lead the IT professional to a root cause of a problem and to eliminate other possible causes. For example, a flowchart for a problem related to web browsing may include steps for ensuring that the user's computer has Internet connectivity, that the computer is functioning normally, that the computer was able to resolve the name of a server to an Internet Protocol (IP) address using the Domain Name System (DNS), and so forth.

Web-based static flowcharts for troubleshooting exist today that guide readers through a defined process to determine the root cause of a problem and provide the steps to resolve the problem. Many IT departments provide internal websites (e.g., intranets) with flowcharts and knowledge bases related to previously seen problems. Past attempts to make flowcharts interactive have added pop-up dialogs that appear as a user clicks a step or hovers over a step to provide additional information about the step. Some solutions have also provided clickable boxes that perform a diagnostic or corrective step. For example, if the first step is creating a user account, then clicking the box may open a web page that describes how to create a user account.

One problem with static troubleshooting flowcharts and past attempts at interactivity is that they show the entire troubleshooting process at the same time. For complex troubleshooting scenarios, the result is visual clutter and the process to identify the root cause can be difficult to follow. Users can easily lose their place in the process when switching between a web browser and troubleshooting tools. This leads many readers to print the flowchart and then manually indicate their current place in the path through the flowchart on the printed copy.

Another problem with static flowcharts is that there is no feedback to flowchart authors, and by extension, their product teams, to indicate how the flowcharts are being used, if they are effective in solving customer problems, or if there are product improvements that can be made to address root causes or make troubleshooting more efficient through tools. For example, a static flowchart author cannot easily determine which paths through the flowchart are the most commonly followed so that future enhancements to products can mitigate or eliminate the most common types of problems. Flowchart authors may not know whether a given path through the flowchart to a root cause actually solves a reader's problem.

Additionally, with a static flowchart, it is much more difficult for a reader to glean and understand the relationships between system components and the use of tools in an overall troubleshooting methodology. In other words, a static troubleshooting flowchart helps a reader solve a problem, but does not teach them how to troubleshoot without the flowchart or to have a deeper understanding of troubleshooting tool use or system component interaction to troubleshoot problems that the flowchart does not address. To paraphrase a Chinese proverb, the static troubleshooting flowchart gives a reader a fish, but does not teach the reader how to fish.

SUMMARY

An interactive troubleshooting system is described herein that provides a dynamically changing user interface that readers click through to solve problems. Each click changes the display of the flowchart so that irrelevant troubleshooting options are unavailable and the reader's path through the overall flowchart is clearly shown. By showing the path, the reader can see the troubleshooting process and the interrelationships between system components and understand more deeply the process beyond the step-by-step troubleshooting tasks. The interactive troubleshooting system clearly displays a path taken through the flowchart, reduces visual clutter, and records the path taken for later analysis. When following a path, sections of the flowchart that cannot be followed due to the steps taken are made unavailable. The interactive troubleshooting system provides a visual indication of areas of troubleshooting focus. The system also allows backtracking—the ability to go back to a previous step taken and go down an alternate path. When a previous step is clicked, the lit up portions past the clicked step become unavailable, rolling the user's progress back to the element clicked. The interactive troubleshooting system provides cross-linking between troubleshooting flowcharts so that a reader can navigate seamlessly from one flowchart to another. Once a root cause is identified, the system can query the user to capture end-of-process feedback information. Thus, the interactive troubleshooting system provides dynamic, interactive flowcharts that update based on a user's progress through the flowchart and that provide ways to create better flowcharts or products in the future.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
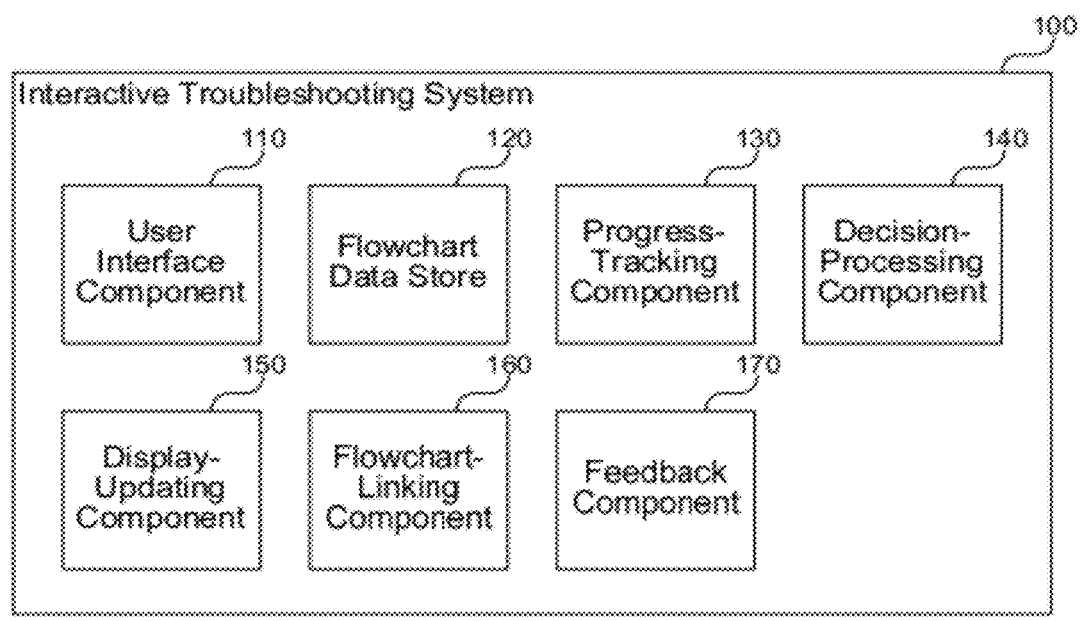
FIG. 1 is a block diagram that illustrates components of the interactive troubleshooting system, in one embodiment.

An interactive troubleshooting system is described herein that provides a dynamically changing user interface that readers click through to solve problems. Each click changes the display of the flowchart so that irrelevant troubleshooting options are "greyed out" (unavailable) and the reader's path through the overall flowchart is clearly shown. By showing the path, the reader can see the troubleshooting process and the interrelationships between system components and understand more deeply the process beyond the step-by-step troubleshooting tasks (teaches the reader how to fish while giving them a fish). The interactive troubleshooting system clearly displays a path taken through the flowchart. For example, the system "lights up" the path that the reader has taken through the flowchart by highlighting boxes and/or connections between boxes (and hiding or dimming the non-taken paths and elements). The system reduces visual clutter. For example, upon first loading the user interface, the entire flowchart except for the starting step may be unavailable ("greyed out"). Steps beyond the current step may also be unavailable, so that the user sees clearly where to go next. Upon following a path, sections of the flowchart that cannot be followed due to the steps taken are made unavailable.

The interactive troubleshooting system provides a visual indication of areas of troubleshooting focus. For example, troubleshooting problems can often be broken down into separate areas, which can be clearly indicated by using coloring or background shading of sections of the overall flowchart. In some embodiments, the system allows backtracking—the ability to go back to a previous step taken and go down an alternate path. For example, each step in the flowchart that is lit up is clickable (including the current and prior steps), allowing the reader to go back and take an alternate path. When a previous step is clicked, the lit up portions past the clicked step become unavailable, rolling the user's progress back to the element clicked. The system may also record the path taken. For example, on a web server hosting the flowchart, the path taken by readers through the flowchart can recorded and made available for analysis by flowchart authors and product teams to determine common root causes and ways the flowcharts are used.

In some embodiments, the interactive troubleshooting system provides cross-linking between troubleshooting flowcharts. For problems that have multiple technology areas that can be the root cause, interactive troubleshooting flowcharts can be linked together so that the reader can step through the different technology areas. For example, an interactive troubleshooting flowchart for troubleshooting wireless local area network (LAN) access can link to separate flowcharts for wireless client configuration, public key infrastructure, wireless AP configuration, RADIUS infrastructure, and Active Directory, all of which can also link to each other. Once a root cause is identified, the system can query the user to capture end-of-process feedback information. For example, the system can query the user to ensure that their problem has been solved or their level of satisfaction with the troubleshooting flowchart. The system may also provide an ability to print a flowchart with the current path indicated or the entire flowchart in which all of the steps are shown. Thus, the interactive troubleshooting system provides dynamic, interactive flowcharts that update based on a user's progress through the flowchart and that provide ways to create better flowcharts in the future that can be improved to address current problems and root causes.

Following is an example user experience walking through a flowchart using the interactive troubleshooting system. The system can be provided through a web application, desktop application, mobile application, or other form of software. Upon first loading the system, the entire flowchart except for the starting step is unavailable. After the user clicks the first step, the possible next steps in the path light up, allowing the user to click to the next step or on the branches of a decision (such as a Yes/No). After the user goes past a section of the flowchart that is no longer possible, that section becomes and remains unavailable.

In some embodiments, all of the steps and branches in a decision path taken by the user remain lit up and are clickable, allowing the user to backtrack and try a different path through the flowchart. If a user clicks a previous step, the lit up portions past the clicked step become unavailable and the clicked step becomes the current step. If the user clicks on a step representing a cross-linked flowchart, that flowchart loads and appends itself to the current path, allowing the reader to access all of the steps in the newly loaded flowchart in a contiguous experience from the current flowchart. After the user gets to a root cause, there is "click when done" button or other indication of completion. Upon selecting this option, the system prompts the user whether their problem was solved (Yes/No) or other concluding questions. At any time, the reader can click a print button to print either the current state of the flowchart or the entire flowchart.

A web server hosting the interactive troubleshooting system provides the following: Hypertext Markup Language (HTML) pages and objects that house the flowchart, the logic of the flowchart (steps, branching points), and the text for each step (which may include resource links to other content). A web server add-in can provide the engine that adapts the flowchart definition (logic and text) to a functioning interactive troubleshooting flowchart.

Many IT professionals spend most of their day troubleshooting issues with complex products and technologies. A comprehensive set of interactive troubleshooting flowcharts allow IT professionals to more quickly deal with troubleshooting issues that have known root causes and to build a deeper understanding of troubleshooting tools, techniques, and system component relationships to deal with troubleshooting issues for root causes that are not known. As IT professionals use the interactive troubleshooting system, they learn more about the system and troubleshooting methodology and the flowchart authors and/or product developers learn ways to improve the product and improve the experience of troubleshooting problems with the product.

FIG. 1 is a block diagram that illustrates components of the interactive troubleshooting system, in one embodiment. The system 100 includes a user interface component 110, a flowchart data store 120, a progress-tracking component 130, a decision-processing component 140, a display-updating component 150, a flowchart-linking component 160, and a feedback component 170. Each of these components is described in further detail herein.

The user interface component 110 displays an interactive flowchart to a user and receives input from the user indicating a path to follow within the flowchart. The component 110 may provide the flowchart through a web application, desktop application, mobile application, or any other way of providing visual software elements to the user. The component 110 receives the user's selections that indicate which flowchart element to visit next. The next element to visit may be a progression from the current flowchart element, such as a choice in a block that provides an option (e.g., Yes/No), or the next element may be a return to a previous element, such as where the user wants to backtrack to a previous choice and select another path. The user interface component 110 may also provide feedback options on behalf of the feedback component 170 to the user for gathering feedback during or after the user's interaction with the displayed flowchart.

The flowchart data store 120 stores one or more flowcharts including any logic and metadata associated with interactive display of the flowchart. The data store 120 may include one or more in-memory data structures, files, file systems, hard drives, databases, cloud-based storage services, or other facilities for persisting data. The data store 120 may contain stored flowcharts for solving or diagnosing a variety of problems and the system may provide searching facilities through which the user can locate an appropriate flowchart to start diagnosis of a particular problem. The metadata may include layout information (e.g., where each block appears relative to other blocks and the blocks' size), tooltip or other help text associated with each block, display text for each block, labels for lines between blocks, resource links associated with each block, links between one flowchart and another, and so on. The logic may include options available at each block, actions that occur when a user selects a block, animations or other visual elements, and so forth.

The progress-tracking component 130 tracks a user's progress as the user selects blocks from a current point in the flowchart to any available next points in the flowchart. The component 130 maintains a historical trail of each block the user visits and the order in which the user visited each block. Where a user makes a choice at an option block, the component 130 may store a label associated with the option chosen by the user (e.g., "Yes" in response to a question). The progress-tracking component 130 may also allow the user to navigate backwards to previous elements in the path taken by the user, so that the user can backtrack to choose a different path. In some embodiments, the component 130 may provide browser-like back and forward buttons that allow a user to return to a previous state of the flowchart, even after backtracking. The progress-tracking component 130 provides information to the display-updating component 150 for highlighting visited and available next blocks.

The decision-processing component 140 processes user selections of available blocks in the flowchart to which the user can navigate. Where a block represents a choice that closes off a non-selected path through the flowchart, the component 140 informs the display-updating component 150 to indicate that the non-selected path is no longer available. Upon selecting a block, the decision-processing component 140 informs the display-updating component 150 to highlight the selected block and any available paths that leave the selected block. The decision-processing component 140 may also display additional information to the user to help the user choose between options at blocks that offer a choice. For example, the component 140 may provide help text that lists criteria for deciding one way or the other or signs to look for in diagnosing a problem that indicate which path is correct.

The display-updating component 150 modifies one or more visual indications that focus user attention to selected parts of the interactive flowchart. The component 150 highlights a current block that indicates the user's progress as well as previously visited blocks that the user may want to revisit. Highlighting may include changing the font, font size, font style (e.g., bold or italics), drawing a bright border, flashing text or other visual elements, or any other visually detectable modification that draws a user's attention. The component 150 may highlight some blocks, such as the current block, differently than others, such as the previously visited blocks. The component 150 may also use color to distinguish different types of blocks, different sections of the flowchart, or distinguish one linked flowchart from another to indicate to the user that the user is crossing a flowchart boundary. The display-updating component 150 may also provide animations, such as arrows between blocks that move from a source block to a target block to indicate an available choice in the interactive flowchart.

The flowchart-linking component 160 tracks and handles activation of links between two or more interactive flowcharts. Often in a flowchart, a user reaches a point that exhausts the information and possible remedies in one flowchart, but that points to a new point in the diagnosis for which another flowchart can provide help. When using the interactive troubleshooting system 100, the user is not limited to viewing one flowchart at a time. Rather, the overall process from start to finish of solving a problem is emphasized. Thus, it is often desirable to seamlessly allow the user to progress from an exit of one flowchart to an entry of another flowchart. To do this, the system provides links between flowcharts that indicate points in one flowchart where a user can jump into another flowchart. The link may include information that identifies the destination flowchart and an entry point within the destination flowchart if entering from a non-standard point. Visually, the display-updating component 150 may display both flowcharts as if they were simply one connected flowchart, but perhaps with different colors or another indicator to signal to the user that the user has reached a different point in the diagnosis and is working within a different technical area.

The feedback component 170 receives feedback from the user that indicates an extent to which the interactive flowchart was helpful to the user. Feedback to the flowchart author stored by the interactive troubleshooting system may include a history of the user's path through the flowchart (both forward and backward), how long the user spent at each step, whether the user clicked resource links within each block, blocks where the user thought more options should be available, blocks where the user indicated a need for improvement, as well as an overall satisfaction of the user with the result provided by the flowchart. The feedback component 170 provides the collected feedback to flowchart authors and/or software product developers to help improve the flowchart and any products for which the flowchart helps solve problems. The feedback component 170 may provide reports that summarize feedback from multiple users, so that authors and developers can determine issues that are frequent and/or most pressing for a remedy.

The computing device on which the interactive troubleshooting system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
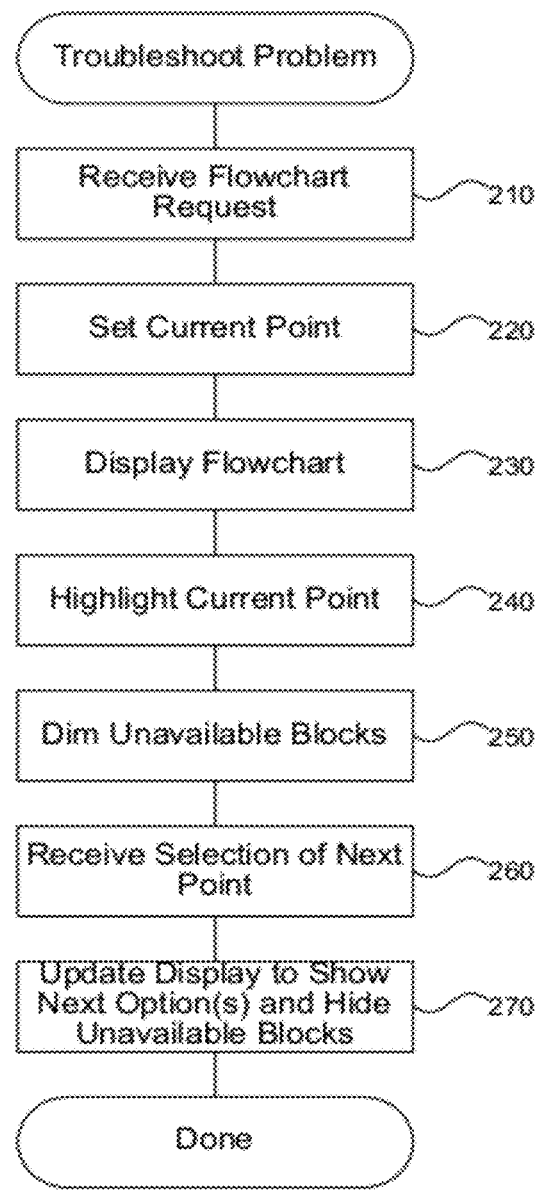
FIG. 2 is a flow diagram that illustrates processing of the interactive troubleshooting system to troubleshoot a problem covered by an interactive flowchart, in one embodiment.

FIG. 2 is a flow diagram that illustrates processing of the interactive troubleshooting system to troubleshoot a problem covered by an interactive flowchart, in one embodiment. Beginning in block 210, the system receives a request from a user to display an interactive flowchart. The request may originate from other systems (not shown) that allow the user to search for flowcharts among a stored body of flowcharts for solving one or more problems or performing one or more tasks. In some cases, the system may provide a flowchart that helps the user find the right flowchart for a current problem or task the user is facing. The system receives the request, locates the requested flowchart, and loads the flowchart for display to the user.

Continuing in block 220, the system sets a current point within the flowchart that marks a current specific block within the flowchart to which the flow has progressed. In most cases, the flowchart will start at a default entry point. The entry point may provide the user with introductory information or a first task or decision that will help narrow down an appropriate answer to the user's problem. In other cases, the starting point may be a block within the flowchart other than the default entry point, such as upon entering the flowchart after progressing through a previous flowchart that may duplicate some questions in the current flowchart.

Continuing in block 230, the system displays the flowchart to the user. The system may display the flowchart through a web page, application window, mobile device screen, or other display facility. The system may divide the flowchart into logical pages and display only a portion of the flowchart to the user that represents a first page. In such cases, the system allows the user to scroll to view other parts of the flowchart. Continuing in block 240, the system provides a visual indication of the current point within the flowchart so that the user is made aware of a specific location within the flowchart and one or more available directions for progressing from the current point. The visual indication may include highlighting the current point, flashing the block of the current point, or other visually distinct display techniques.

Continuing in block 250, the system visually diminishes unavailable blocks in the flowchart. Blocks may be unavailable because they are part of routes not taken in previous parts of the flowchart or because they are not reachable from the current point in the flowchart without passing through other blocks first. As the user makes selections in the flowchart to progress from block-to-block, the system updates the blocks or decisions (such as Yes or No) to indicate which are available and which are not. Visually diminishing blocks may include dimming the blocks, removing them from the display entirely, greying out the blocks, or other visually distinct display techniques for deemphasizing unavailable blocks.

Continuing in block 260, the system receives a user selection of an available block or decision in the flowchart that indicates a next point of progress through the flowchart. The system may receive a user click, touch, key press, or other user input that provides the selection. The selection may indicate a next block in a connected series of blocks, a choice between one or more decision options following from a decision block, or a previous block to which the user wants to backtrack to make a different set of selections.

Continuing in block 270, the system updates the displayed flowchart based on the received selection to provide a visual indication of the path taken, to provide a visual indication of one or more available directions for progressing from the next point, and to visually diminish any blocks made unavailable by the received selection. For example, the system may dim blocks that flow from a choice the user did not select and highlight blocks down a path the user did select. In this way, the user is made aware of where the user is in the flowchart, even if the user has to change tasks to view other diagnostic tools. The user is also made aware of what possible options the user can select next, and visual clutter is reduced by deemphasizing options that are not available. After block 270, these steps conclude.

Figure 3:
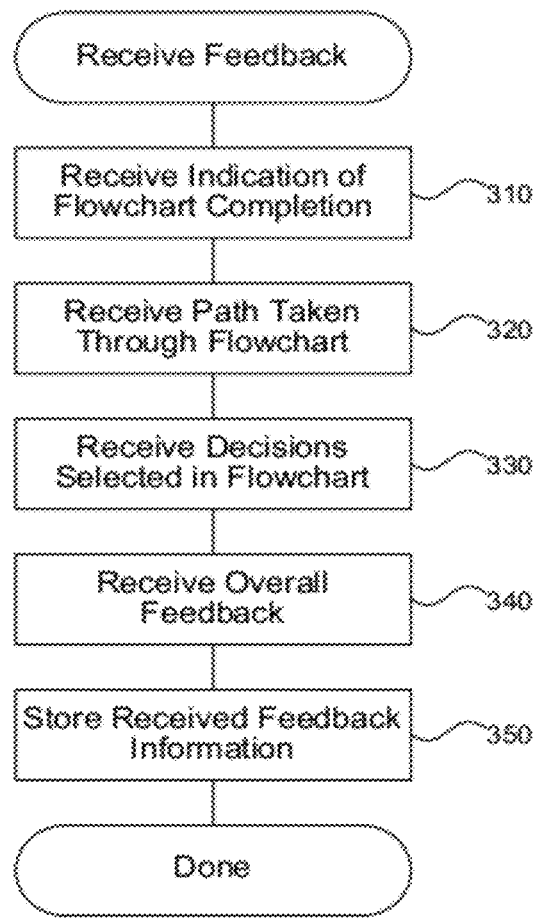
FIG. 3 is a flow diagram that illustrates processing of the interactive troubleshooting system to receive feedback from a user of an interactive flowchart, in one embodiment.

FIG. 3 is a flow diagram that illustrates processing of the interactive troubleshooting system to receive feedback from a user of an interactive flowchart, in one embodiment. Beginning in block 310, the system receives an indication that a user has completed a path through an interactive flowchart. For example, the user may click a "Done" button or exit a flowcharting application, and the system may receive information about the user's session while using the flowchart. A web site or other server that provides flowcharts may collect information about a user's interaction with flowcharts and store information about the user's session as the user progresses through a flowchart or after a user is finished with a flowchart.

Continuing in block 320, the system receives information indicating the path taken through the interactive flowchart, including specific blocks visited by the user and the resource links they may have activated within the text or other clickable element for the block. The system may track a log of which blocks the user clicks on or selects through other input methods and their corresponding resource links. In addition, the system may capture information about time that passes between user selections that may indicate a duration of each step in the flowchart. This may be useful to flowchart authors or product developers as the step may indicate particularly difficult diagnostic steps in solving a problem.

Continuing in block 330, the system receives decisions selected by the user in the flowchart. While many flowchart blocks may instruct the user to perform a diagnostic activity, decision points in the flowchart indicate responses from the user to questions posed by the flowchart. These decisions may indicate particularly difficult points in the use of a product or in diagnosing problems with the product and the system may compile statistics about particular decisions selected so that flowchart authors and product developers can address indicated problems.

Continuing in block 340, the system receives overall feedback that indicates a user's satisfaction with the interactive flowchart. For example, the system may prompt the user to rate the user's experience on a scale of 1-10 or by indicating whether the flowchart solved the user's problem. Continuing in block 350, the system stores the received feedback information in a data store. The system may compile feedback from many users and provide reports or other summaries of compiled data so that flowchart authors or product developers can process the feedback and make appropriate flowchart or product changes. After block 350, these steps conclude.

Figure 4:
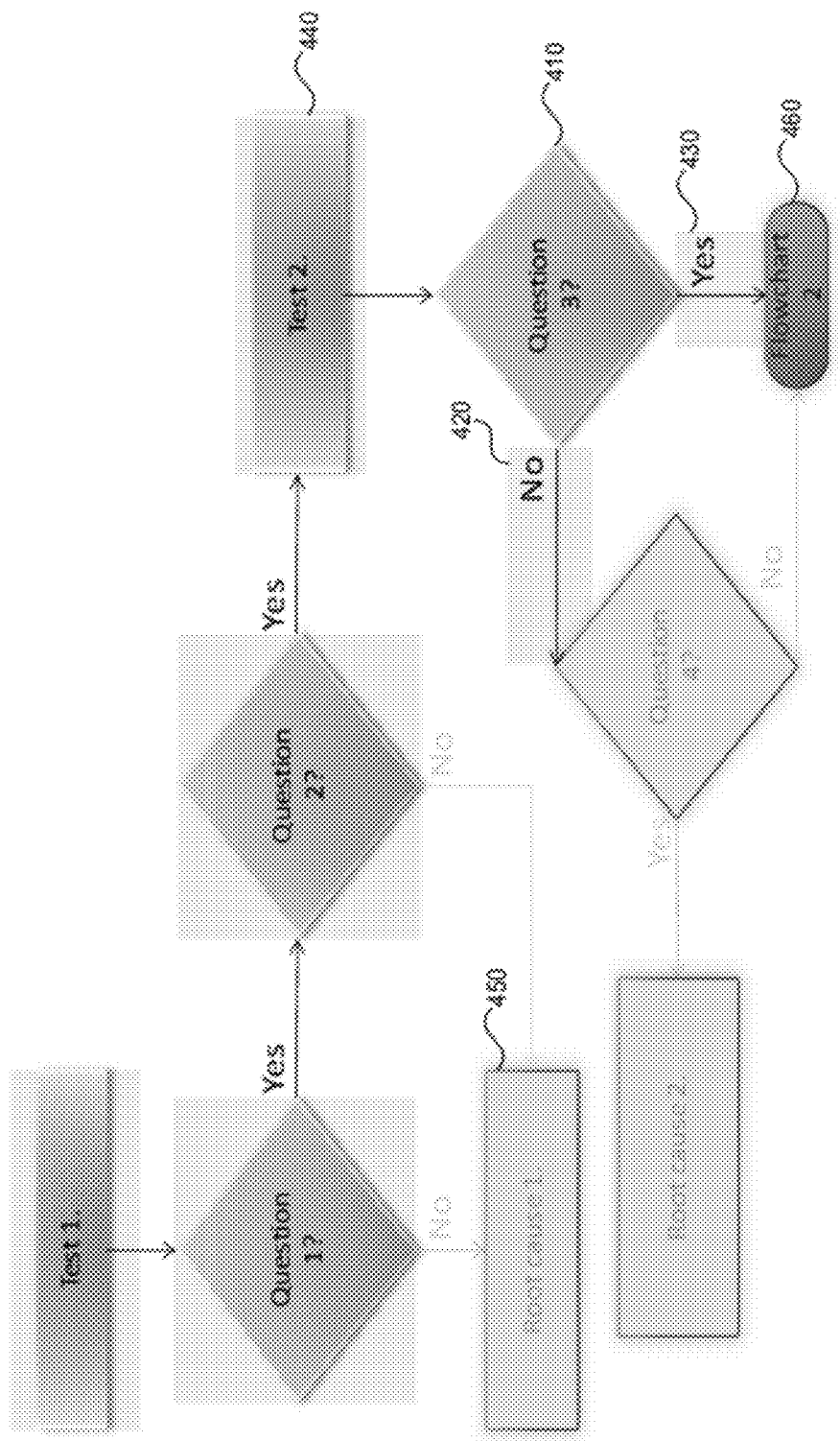
FIG. 4 is a display diagram that illustrates an interactive flowchart provided by the interactive troubleshooting system, in one embodiment.

FIG. 4 is a display diagram that illustrates an interactive flowchart provided by the interactive troubleshooting system, in one embodiment. The interactive flowchart is displaying a currently active point 410. The flowchart highlights two directions that a user can select from the current point 410, a No option 420 and a Yes option 430. Clicking either of these options will set the current point to the blocks to which the options point. The system also highlights the previous blocks selected by the user, such as block 440, to which the user can backtrack to make a different set of selections and follow a different path through the flowchart, or repeat steps to return to the same current point 410. The system also dims unavailable blocks, such as block 450, which the user cannot currently visit without backtracking to the blocks that lead to the currently unavailable blocks. Block 460 illustrates a linked second flowchart to which the user can progress by selecting that block 460 or the Yes option 430 that leads to it. The visual display clearly conveys to the user the current point 410 of progress, how the user got to this point, and where the user can go from here (as well as where the user cannot go).

In some embodiments, the interactive troubleshooting system shows a relationship between related blocks in a flowchart using colors or other visual indicators. For example, solving a particular problem may include determining network connectivity, diagnosing DNS resolution, and so forth. The system may display each region of the flowchart using a color to indicate to the user when the user is making a transition from one higher-level task (e.g., determining network connectivity) to another higher-level task (e.g., diagnosing DNS resolution). This gives the user a sense of greater progress through the flowchart and teaches the user a purpose behind a particular set of steps, such as the logical segmentation of some types of problems.

In some embodiments, the interactive troubleshooting system stores a history of selections made by the user that may transcend the user's final steps through the flowchart. For example, a user may navigate from a first block to a second block, and then back to the first block. The user is currently at the first block, and the interactive flowchart will show that, but the system may also know that the user arrived at the first block by visiting the second block and then backtracking. This information may be useful as feedback to the flowchart author. In addition, the system may provide back/forward controls that allow the user to return to a previous state of progress. In this way, the user can try several options, knowing that the user can safely undo a bad choice by selecting the back control to return to the previous point where the user wants to be.

In some embodiments, the interactive troubleshooting system stores an audit log that indicates how long the user spent on each step of an interactive flowchart. Steps where the user spends more than an average amount of time may indicate steps that should be broken up into smaller steps, points of difficulty in solving problems, or other causes of time delay. This feedback can help flowchart authors or product developers improve flowcharts or provide more efficient troubleshooting tools.

In some embodiments, the interactive troubleshooting system provides a visual design tool for creating new interactive flowcharts. The system can provide an integrated development environment (IDE) and tools for creating flowcharts with which users can interact. The design tool allows the flowchart author to place blocks on a visual layout, identify logic associated with each block or between blocks, edit text and other stylistic features of the blocks, and publish completed flowcharts for consumption by users.

From the foregoing, it will be appreciated that specific embodiments of the interactive troubleshooting system have been described herein for purposes of illustration, but that various modifications may be made without deviating from the spirit and scope of the invention. Accordingly, the invention is not limited except as by the appended claims.

I claim:

1. A computer system for providing dynamic, interactive flowcharts, the system comprising a processor and a memory configured to execute software instructions that cause the processor to:
   receive a request from a user to display an identified interactive flowchart;
   set a current point within the flowchart that marks a current specific block within the flowchart to which the flow has progressed;
   display the flowchart to the user;
   provide a visual indication of the current point within the flowchart so that the user is made aware of a specific location within the flowchart and one or more available directions for progressing from the current point;
   display unavailable blocks not selected in flowchart routes previous to the current specific block distinctly from previously-selected blocks;
   receive a user selection of an available block in the flowchart that indicates a next point of progress through the flowchart;
   update the displayed flowchart based on the received selection to provide a visual indication of the path taken, to provide a visual indication of one or more available directions for progressing from the next point, and to visually diminish any blocks made unavailable by the received selection;
   receive a second selection of an available block comprising a cross-link flowchart, wherein the cross-link provides links between the displayed flowchart and an entry point for a destination flowchart;
   update the displayed flowchart to append the path to display the destination flowchart at the entry point, to provide a visual indication of one or more available directions for progress of the destination flowchart, and to visually diminish any blocks made unavailable by the second selection; and
   track a user's path and progress as the user selects blocks from a current point in the flowchart to any available next points in the flowchart and maintain a historical trail of each block the user visits, including backtracks, the order in which the user visited each block, the time spent at each block, cross-links selected, and the resource links selected within each block.

2. The method of claim 1 wherein the software instructions that cause the processor to receive the request cause the processor to allow the user to search for flowcharts among a stored body of flowcharts for solving one or more problems or performing one or more tasks.

3. The method of claim 1 wherein the software instructions that cause the processor to receive the request cause the processor to, after receiving the request, locate the requested flowchart and load the flowchart for display to the user.

4. The method of claim 1 wherein the software instructions that cause the processor to set the current point cause the processor to start at a default entry point identified within the interactive flowchart.

5. The method of claim 1 wherein the software instructions that cause the processor to set the current point cause the processor to receive an indication of a block within the flowchart other than a default entry point upon entering the flowchart after progressing through a previous flowchart.

6. The method of claim 1 wherein the software instructions that cause the processor to display the flowchart cause the processor to display the flowchart through a web page, application window, or mobile device screen.

7. The method of claim 1 wherein the software instructions that cause the processor to display the flowchart cause the processor to divide the flowchart into logical pages and displaying only a portion of the flowchart to the user that represents a single page.

8. The method of claim 1 wherein the software instructions that cause the processor to update the displayed flowchart cause the processor to highlight the current point.

9. The method of claim 1 wherein the software instructions that cause the processor to update the displayed flowchart cause the processor to visually diminish blocks that are part of routes not taken in previous parts of the flowchart that are not reachable from the current point in the flowchart.

10. The method of claim 1 wherein the software instructions that cause the processor to receive the user selection of the available block cause the processor to receive a selection of a next block in a connected series of blocks, a choice between one or more decision options following from a decision block, or a previous block to which the user wants to backtrack to make a different set of selections.

11. The method of claim 1 wherein the software instructions that cause the processor to update the displayed flowchart cause the processor to dim blocks that flow from a choice the user did not select and highlighting blocks down a path the user did select.

12. A computer system for providing dynamic, interactive flowcharts, the system comprising:
  a processor and memory configured to execute software instructions embodied within the following components;
  a user interface component configured to:
    display an interactive flowchart to a user;
    receive a first input from the user indicating a path to follow within the interactive flowchart;
    receive a second input indicating a selection of an available block comprising a cross-link flowchart, wherein the cross-link provides links between the interactive flowchart and an entry point for a destination flowchart;
  a flowchart data store that stores one or more flowcharts including any logic and metadata associated with interactive display of the interactive flowchart;
  a progress-tracking component configured to track a user's path and progress as the user selects blocks from a current point in the flowchart to any available next points in the flowchart and configured to maintain a historical trail of each block the user visits, including backtracks, the order in which the user visited each block, the time spent at each block, cross-links selected, and the resource links selected within each block;
  a decision-processing component that processes user selections of available blocks in the flowchart to which the user can navigate;
  a display-updating component configured to:
    modify one or more visual indications that focus user attention to selected parts of the interactive flowchart, wherein the display-updating component removes from the display of the interactive flowchart unavailable blocks in the flowchart; and
    update the displayed interactive flowchart to append the path to display the destination flowchart at the entry point, to provide a visual indication of one or more available directions for progress of the destination flowchart, and to visually diminish any blocks made unavailable by the second input;
  a flowchart-linking component that tracks and handles activation of links between two or more interactive flowcharts; and
  a feedback component that receives feedback from the user that indicates an extent to which the interactive flowchart was helpful to the user.

13. The system of claim 12 wherein the user interface component is further configured to receive the user's selections that indicate which flowchart element to visit next, where the next element to visit is a progression from the current flowchart element or a return to a previous element.

14. The system of claim 12 wherein the flowchart data store is further configured to contain stored flowcharts for solving or diagnosing a variety of problems and to provide a searching facility through which the user can locate an appropriate flowchart to start diagnosis of a particular problem.

15. The system of claim 12 wherein the display-updating component is further configured to highlight a current block that indicates the user's progress as well as previously visited blocks that the user may want to revisit.

16. The system of claim 12 wherein the flowchart-linking component is further configured to provide links between flowcharts that indicate points in one flowchart where a user can jump into another flowchart, wherein the link includes information that identifies the destination flowchart and an entry point within the destination flowchart.

17. The system of claim 12 wherein the feedback component is further configured to provide collected feedback to a flowchart author and/or a software product developer to help improve the flowchart and any products for which the flowchart helps solve problems.

* * * * *